Jan. 3, 1967   R. NOUEL   3,296,353
METHOD OF INJECTION MOLDING UTILIZING ACCUMULATING CHAMBERS
Filed April 15, 1963   4 Sheets-Sheet 1
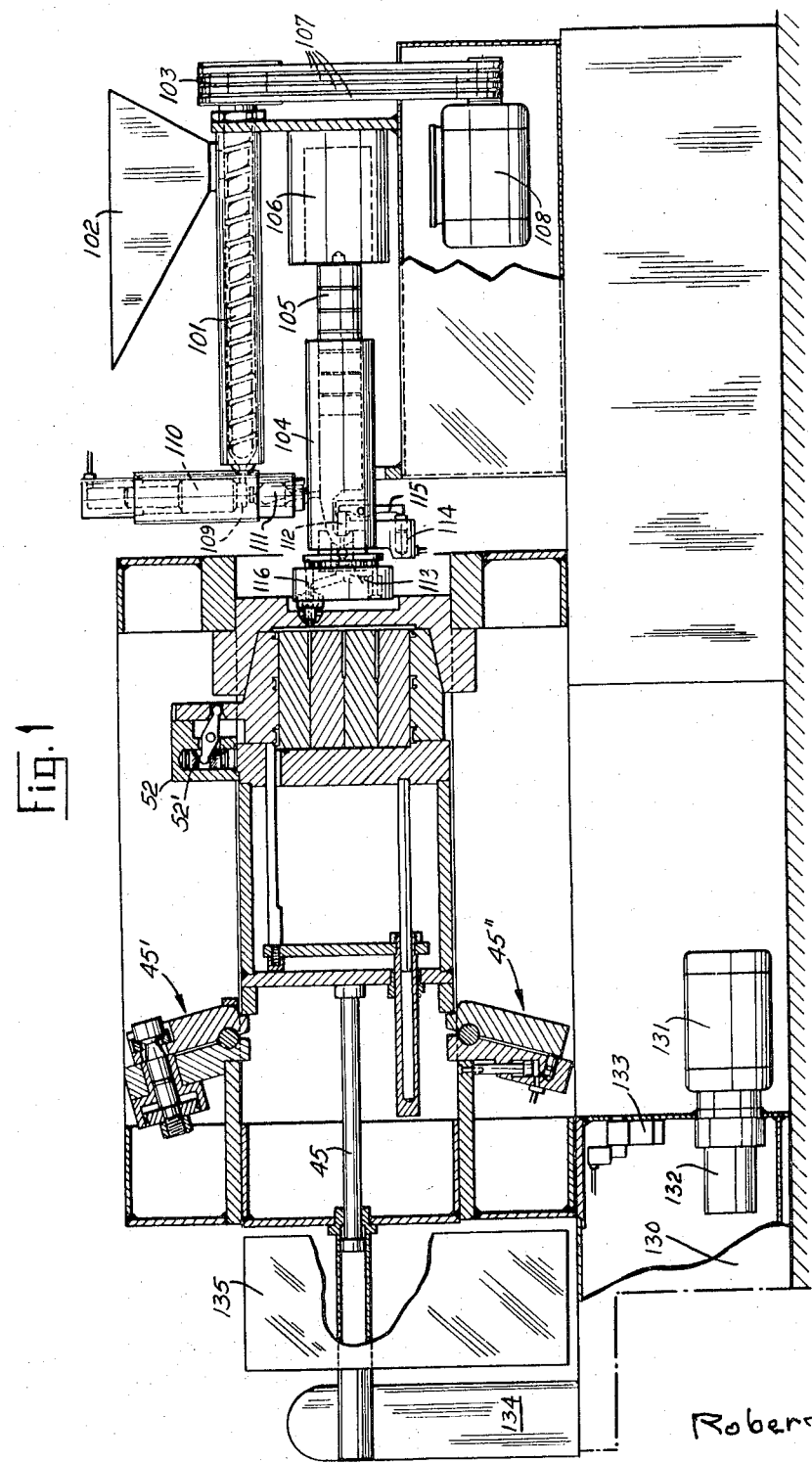
INVENTOR
Robert Nouel
BY Theodore Bish
ATTORNEY Jan. 3, 1967   R. NOUEL   3,296,353
METHOD OF INJECTION MOLDING UTILIZING ACCUMULATING CHAMBERS
Filed April 15, 1963   4 Sheets-Sheet 2
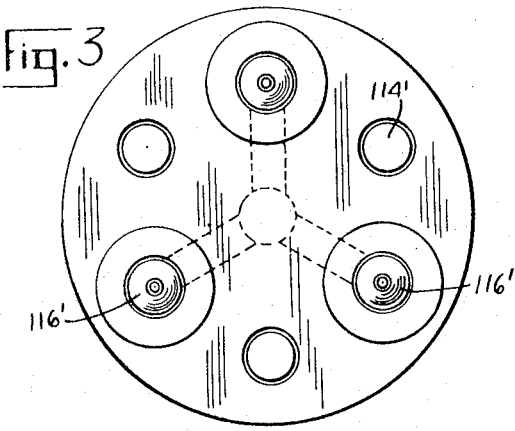
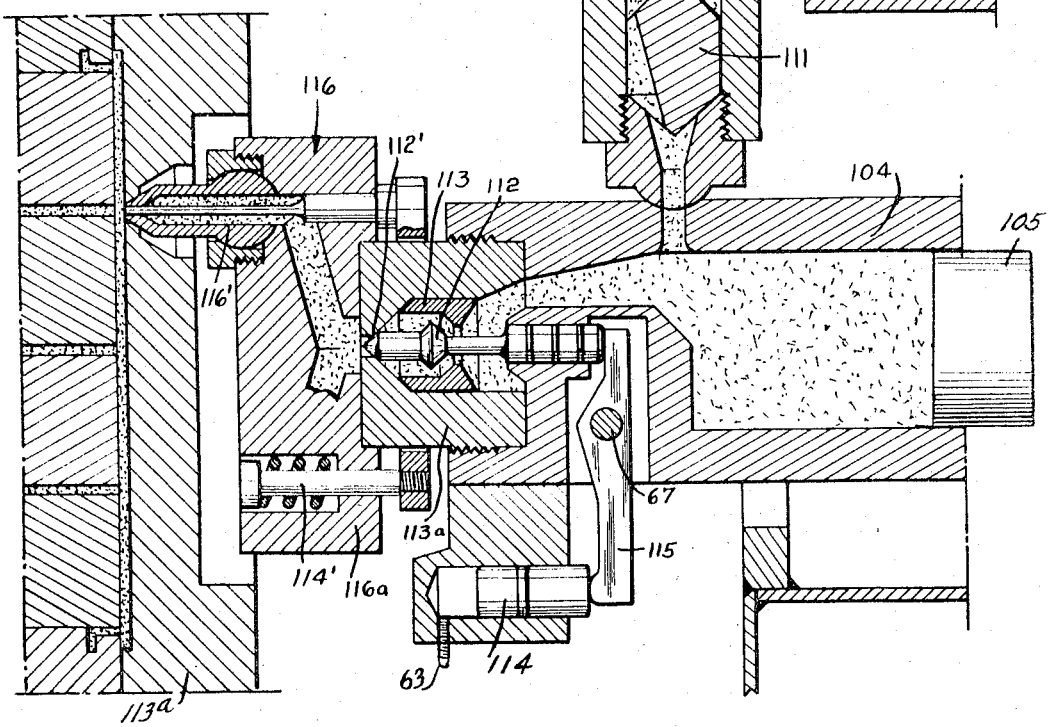
INVENTOR
Robert Nouel
BY Theodore Bishop
ATTORNEY

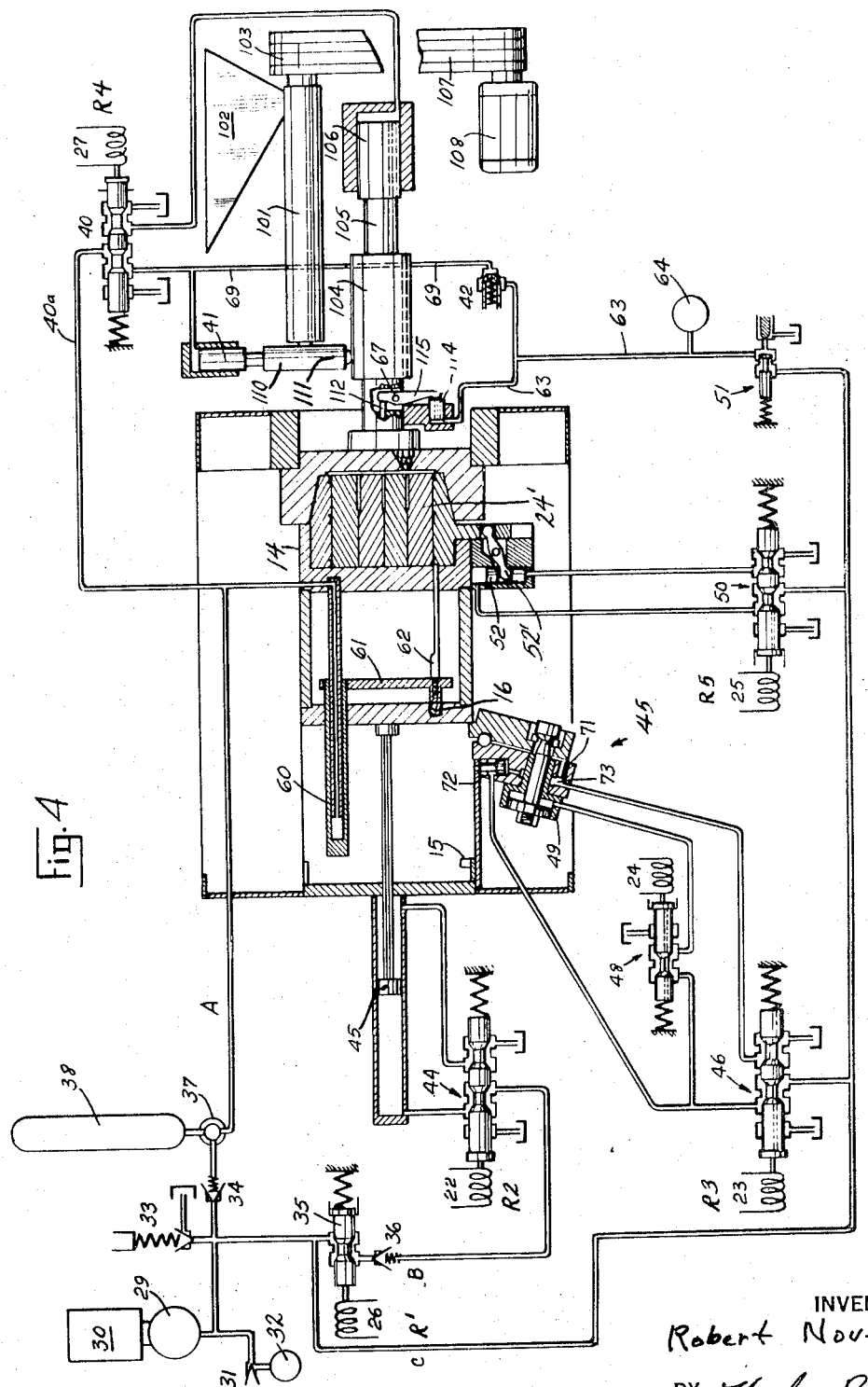

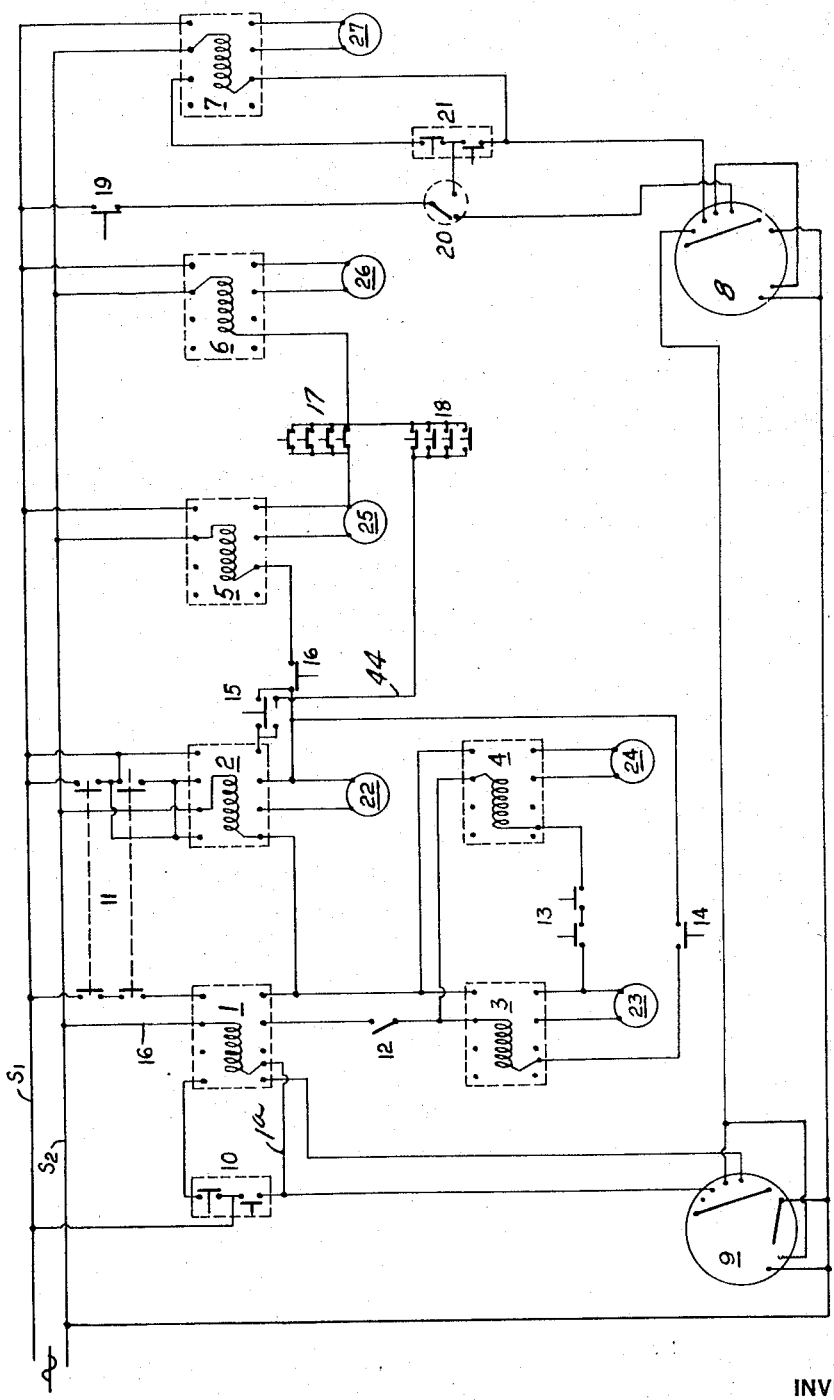

United States Patent Office 3,296,353
Patented Jan. 3, 1967

3,296,353
METHOD OF INJECTION MOLDING UTILIZING ACCUMULATING CHAMBERS
Robert Nouel, Villejuif, Seine, France, assignor to Inventions Finance Corporation, a corporation of Delaware
Filed Apr. 15, 1963, Ser. No. 273,144
11 Claims. (Cl. 264—329)

This application is a continuation-in-part of copending applications 89,254 filed February 14, 1961, 171,878 filed February 2, 1962, and 206,507 filed June 29, 1962.

This invention relates to forming plastics by using special mobile elements for molding large size parts, and more particularly to a method of molding and a machine for carrying this method into practice.

The chief characteristics of the invention resides in keeping a mold closed without using a press. Novel and entirely distinct features are utilized in the methods and apparatus hereof, and those features have precise uses and purposes, the exceptional and novel advantages of which will become apparent from the description which follows.

In my co-pending application the companion applications are S.N. 89,254 filed February 14, 1961, S.N. 171,878 filed February 2, 1962 and S.N. 206,507, filed June 29, 1962, of which the present application is a continuation in part, my new methods of introducing plastic material into a mold under pressure and the regulation and control of the same material by said pressure, are fully described. The present invention is to effect certain improvements in the apparatus of said applications. While said co-pending applications are related primarily to vertical machines having conventional pressing sections the present disclosure relates to horizontal type molding machines which maintain the mold cavity components locked in position under substantial force and yet which eliminate the well-known piston-cylinder and toggle press sections of the conventional type machine.

By eliminating the conventional press section of an injection molding machine, the molding method of the present invention is no longer subjected to many limitations and the stringent requirements of the standard presses, such as critical spacing between columns, size of platens, height of mold, length of opening stroke, etc. Since it is no longer necessary to take the distance between the columns into account, the molded components can be produced according to this new system in very large sizes.

Hydromechanical force applying devices are utilized to maintain the mold sections in engagement and the simplified nature of the hydromechanical force devices described hereinbelow, and their high power-to-weight ratio and low power consumption are significant factors which permit the attainment of very high clamping power, such power can be increased in proportion to the number and the force of the applying units utilized.

In addition, a special unit for plasticizing the material is incorporated in the molding apparatus. This special unit possesses several improved features. First, a chamber for recovering the plasticized material permits the use and continuous rotation of a plasticizing screw. This continuous rotation results in a uniform plastic free from tainting, and also leads to greater plasticization. Secondly, the unit is equipped with an automatic system for regulating the pressure of the plastic within the mold. Some very important advantages result from this regulating system, namely an adjustable final injection pressure, high injection speed, and the ability to use highly simplified hydraulic circuit means. Finally, a special hydraulic unit supplies the power required. This power is accumulated in a special oleo-pneumatic tank, which allows for rapid injection of the plastic into the mold.

The new method of this invention is not subjected to any of the stringent and troublesome operating requirements of conventional molding methods. It is intended for the production of heavy mold pieces having a large frontal surface area, through the use of said methods and machines of the invention, in particular, the special regulating and hydromechanical systems described herein.

Certain apparatus embodiments of the invention contemplate utilizing individually and in combination: (a) special hydromechanical force applying devices as described in my co-pending applications the companion applications are S.N. 173,103, filed February 13, 1962, S.N. 187,480, filed April 16, 1962 and S.N. 206,508, filed June 29, 1962; (b) a special plasticization, injection and regulation system as described in my two co-pending applications those applications are S.N. 89,254, filed February 14, 1961, and S.N. 171,878 filed February 2, 1962 and (c) a cooperating hydraulic control arrangement for supplying the power required for the operation of the overall system.

The principal object of the invention is the provision of a new method of molding, and an apparatus to carry out said method of molding, which method and apparatus can be used on, or in combination with, available injection molding machines.

Other and more specific objects of the present invention are to provide: (a) a method of molding for performing such method of molding, capable of producing mold pieces having large frontal molded surfaces; (b) such a method which is capable of providing molded articles through lower injection temperatures than previously encountered and with high injection speeds; (c) such a method and apparatus which achieve the desired result with reduced contraction, a low power consumption in the mold, and reduced size and cost of the machine.

Further objects and embodiments of the invention will become apparent when consideration is given to the following detailed description of the invention. The description refers to the annexed drawings, wherein:

FIGURE 1 is a side sectional view of one form of molding machine provided hereby and adopted to carry out the method embodiments of the present invention, FIGURE 2 is an enlarged view of the regulation section of the machine shown in FIGURE 1, FIGURE 3 is a top view of the mold feeding nozzle of the machine shown in FIGURE 1, FIGURE 4 is a schematic diagram illustrating the hydraulic operation and regulation system of a machine constructed in accordance herewith, and FIGURE 5 is another schematic diagram but illustrating the electrical regulation system of a machine constructed in accordance herewith.

By reference to the drawings and the following description, it will be seen that the feed unit of the machine shown in the drawings and constructed as herein described is equipped with a special plasticizing screw mechanism and a chamber which recovers the excess plasticized material from said screw mechanism during the injection process. This recovery process enables the feed or plasticizing screw to be rotated continuously, which in turn results in a uniform plastic, free from any defects due to overheating.

The plasticizing section of the unit consists of a plasticizing means, a transfer section and a regulating section.

The plasticizing section comprises as shown in FIGURE 1, an extruding screw 101, by hopper 102 for supplying plastic to the screw, a motor 108 for driving the screw through driving belts 107, and a reduction unit 103 as shown in FIGURES 1 and 4. This section further includes a recovery chamber 109 forming a variable capacity reservoir. The reservoir has a hydro actuated piston 110 therein for the plasticized material, and a non-return or check valve 111 (FIGURE 2) permitting free passage of material from the screw 101 toward the transfer cylinder 104. Said transfer cylinder and its delivery piston 105 are actuated by hydraulic piston 106, as shown best in FIGURE 4.

At the head of the transfer cylinder 104, I provide a regulating section including the regulating seat or ring 113 and cooperating obturating and regulating slide valve 112. A small hydraulic piston 114 (FIGURES 1, 2 and 4) provides the regulating and obturating of both pressures and speed which are controlled by lever 115. Said regulating section is equipped at its inlet end with a distribution block 116 incorporating a plurality of automatically obturated nozzles 116′ which feed the mold cavity at several different points. Springs 114′ urge block 116a of distribution system 116 into engagement with the block 113a having regulator slide valve 112 and its associated seat 113 therein.

Regulator or slide-valve 112, which is an important feature of the apparatus provided hereby, permits the high-speed introduction of the plastic, together with full control over the rate of feed and the final low pressure prevailing inside the mold. This low final pressure makes possible up to a tenfold increase in the frontal molding area. Regulation in this embodiment is insured by hydraulic piston 114, which provides regulating and obturating pressures alike. These two pressures replace the regulating spring 67 and the obturating spring 63 in FIGURES 3 and 8 of my co-pending application S.N. 171,878, entitled Method and Apparatus for Molding Plastics. The regulator 112 is subjected, through the medium of lever 115, to the countering thrust of the hydraulic piston 114.

As stated in my prior copending applications, regulator-valve 112 is designed and constructed for an automatic, preregulated control of the flow of the molding material according to determined or predetermined molding requirements, to operate as pressure responsive and is restricted to a pressure operated valve, operating on a different principle than valve 111, for a different purpose, to give a completely different result.

Regulator-valve 112 has rectilinear reciprocation along the feed axis. It has two shoulders of equal area and in opposed relation on the upstream side of the valve port, so that the pressure exerted on the valve element is in balance and will not tend to move the valve. On the down stream side of the valve port, there is a surface exposed to the pressure, that develops in the mold to tend to close the valve. As the pressure in the mold builds up, there is a linkage mechanism that is spring biased, the spring determining the mold pressure required to cause closure of the valve.

When the pressure in the mold drops as the moldable material sets, due to reduction in volume of the moldable material, valve 112 will open due to this drop in pressure. Applicant has conceived of maintaining the injection pressure constant by injecting a slight additional amount into the mold. This injection of an excess of pressure causes the pressure responsive valve 112 to open again. This method operating through a valve which is pressure operated and pressure controlled and which has an independant pressure device to operate through the medium of electrical or fluid pressure operated system as shown at 114, 114′, 115, 67 and 63 of FIGURES 1 and 2 is novel in concept, method and execution as described and claimed in my co-pending applications S.N. 89,254, S.N. 171,878 and S.N. 206,507.

HYDRAULIC PISTON 114

The thrust exerted by the hydraulic piston 114, is adjusted according to the pressure which it is required to be responsive on completion of the mold feeding operation. The hydraulic circuit associated with the regulating section is very simple. A hydraulic regulator 51 supplies the regulating pressure, while the obturating pressure is tapped off the injection distributor. This pressure is therefore the total pressure and is exerted only when the transfer piston 105 is withdrawn and the recovery chamber piston 110 is advancing. It will be noted that this advance gives rise to a dual feed. These two flows of material mix together and pass through the non-return valve 111, after which another mixture takes place in conjunction with a rapid withdrawal of piston 105.

HYDRAULIC UNIT

As stated hereabove, the general design of this molding machine takes due account of two important features, namely the means used to control the material and the hydromechanical clamps. Its hydraulic unit contains all the hydraulic components for supplying the power required for the operation of the system. This will be clearly understood from an examination of the electrical control panel 135 (FIGURE 1) and the corresponding wiring diagrams (FIGURE 5). The great simplicity of operation of the system has been achieved by grouping together the distributors 133 and the flexible lines supplying the various valves. In the specific example illustrated, the hydraulic power section comprises a tank 30, a hydraulic pump 32, an electric motor 29, a hydraulic accumulator 38, distributor control valves 31, 33, 34 (FIGURE 4). The hydraulic power section further serves as a support for the force applying clamp closing of the molds.

CLOSURE OF THE MOLDS

In the machine illustrated in the drawings and constructed in accordance with the invention, mold closure is accomplished by means of two individual and separate hydromechanical securing devices. These two clamps which are operated in sequence with other components of the machine, as explained more fully below, secure the mold through external tie rods with the mold hoop acting as a spacer for the tie rods.

In the specific embodiment illustrated, displacement of the mold is obtained by means of a jack which is used to move the mold parts to open and closed positions. In addition, opening of the mold allows the molded part to be ejected. FIGURE 1 clearly shows that the mold herein described is a special mold made up of shell sections. Lateral stripping means are provided to extract any unstrippable parts from the mold.

The two clamps 45′ and 45″ illustrated exert a pressure of 300 tons each so that the mold will be clamped with a total pressure of 600 tons. The total weight of the two hydromechanical clamps being 150 kg., one attains the very high power-to-weight ratio of $$\frac{600}{150}=4$$

i.e. a clamping power of 4 tons per kilogram of steel. In other words, 250 grams of steel are required to provide each ton of clamping force.

The very low power consumption (500 cubic centimeters of oil at 300 kg./cm.$^2$ per hydromechanical clamp, i.e.

$$\frac{500 \text{ cm.}^3}{300 \text{ tons}}=1.66 \text{ cm.}^3$$

per ton of clamping force) shows the very small expenditure of energy involved in relation to the clamping power developed.

Each of the said hydromechanical clamps basically consists of a hydraulic power multiplying clamp having a pivoted clamping jaw which is moved beneath the part to be clamped and which then pivots and clamps the mold sections together. In the accompanying drawings, the power consumption is remarkably low; being 1 liter of oil at 300 kg./cm.$^2$ (with the hydraulic accumulator). For a production rate of one four-pound molded part per minute, a pump powered by a three-quarter horsepower motor is entirely adequate. This stresses the very small energy consumption in relation to the 600-ton clamping pressure, which allows for molding very large parts as stated. The power saved can be transferred with advantage to the means used for injecting the material.

The main features of this clamping system, as noted, are the low power consumption, the high clamping power exerted, the small bulk and the low cost of the machine. These assertions are justified by the fact that provision can be made for two hydromechanical clamps positioned side by side on each set of tie rods, whereupon the clamping power increases proportionately and attains 1200 tons. One can thus utilize a mold of the following dimensions:

*Dimensions of the mold*

Closed: 970 x 870 mm.; height 1100 mm.
Open: 1000 x 900 mm.; height 1650 mm.

Distance between the uprights supporting the hydromechanical clamps (overall dimension of the mold): 1300 x 1000 x 1000 mm.

It will be noted that the mold herein described is very large in relation to the object to be molded. This is necessary because of the outer unstrippable areas. Moreover, in the embodiment shown, it would be possible to mold a part measuring 1300 x 900 x 35 high and the frontal molded area would be of the order of 11,700 cm.$^2$.

Several important features result from this system as will be apparent after reviewing the described operation below.

First, there is uniform and rapid plasticization and, secondly, a strict control of the plasticized material. The material is treated as a fluid in the regulator thereby allowing for easy molding. This form of regulating provides absolute control of the degree of opening the molds, in response to the pressure exerted by the plastic. In addition, this form of regulating, eliminates all hydraulic accessories, since there is a direct connection to the accumulator.

The rapid introduction of the plastic into the mold avoids a temperature rise, which means that molding can be carried out at lower injection temperatures, thus leading to greater molding speeds while giving all around better performance and quality molding results.

Furthermore, the regulator, which reduces and controls the pressure of the plasticized material in the mold at the end of the filling operation, circumvents the need to produce massive and expensive molds. Such controls in conjunction with the high injection speed and reduced pressure at the end of the automatic filling process, avoid the enormous internal contractions which take place in the molds and consequently make it possible to reduce the size of said molds.

OPERATION OF THE SYSTEM (1) *Closure.*—The first step is to close a switch 10 which energizes the relay 1 by connecting the same across supply lines 1a and 16. Relay 1 then operates and remains energized by its self-energizing contact, controlled by cooling timer 9, an internal contact between 8 and 10 being provided in the inoperative position. A second relay 2 closes and its closure is controlled by safety switch 11. Said relay 2 operates the advance electromagnet 22, whereupon a five way distributor 44 feeds the cylinder for piston 45 through B, the latter directing the oil to the left. The jack piston 45 moves forward, or to the left as shown.

During the advance of piston 45, pressure fluid feeding passageway A which connects with the mold ejector pistons 60, causes the ejection plate 61 with its ejectors 62 to move back or to the left in FIGURE 4. When it reaches the end of its travel, said plate 61 operates a contact 16 which triggers the electromagnet 25 through relay 5, thus controlling the stripping of the shells 24 from one mold section. A five way distributor 50 is operated by electromagnet 25, and this distributor operates the shell closing system and the shells then advance simultaneously with advance of levers 52, whereupon the contacts 18 close thus connecting relay 6 across the supply lines S$^1$ and S$^2$. With this connection, the motion is stopped by the safety device 35 which cuts off passageway B due to the control of electromagnet 26 by relay 6.

When the mold shells are fully closed, the contact 17 and the relay 6 (which have operated the safety stopping device) opens. The supply of fluid is then resumed via conduit B and the advancing motion of the mold section continues. When the end of travel is reached, with the mold fully closed, a switch 14 is closed thus energizing relay 3 (switch 12 being closed), whereupon the latter relay 3 energizes an electromagnet 23 whereby the return spring of the distributor 46 is compressed and said distributor 46 simultaneously feeds hydraulic fluid from conduit C to effect the advance motion of the hydromechanical clamps 45', 45" and the three way distributor 48. When the limit of travel is reached, contact 13 energizes relay 4 which then closes. Closing of relay 4 energizes electromagnet 24 which in turn actuates the three way distributor 46 and causes the jaws of the hydromechanical clamps to pivot. The closing operation is thus completed.

(2) *Injection.*—When the end of advance motion of the mold section is reached, a switch 19 dispatches current simultaneously to an injection timer 18 (which is then set in motion) and to a relay 7. The latter then closes; the electromagnet 27 operates a five way distributor 40 and pressurized oil is directed from conduit A against piston 41 of passageway 69, whereupon said piston 41 advances. Piston 41 is no longer supplied with oil and non-return valve 111 (FIGURE 2) is no longer under pressure of the plastic material. The obturating pressure in passageway 63 is eliminated, since the material is not under pressure and only a regulating pressure remains in passageway 63 and beneath the obturating and regulating valve piston 114. This regulating pressure is adjustable by means of a hydraulic regulator 51 and is monitored by a pressure gauge 64.

Under the control exerted by valve piston 114, the plastic material enters the mold after it has passed from the plastic material regulating chamber 113a. After the feed process is terminated, the pressure in the regulating chamber 113a increases due to filling of the mold, and stabilizes at the adjusted regulating pressure. Valve 112 moves to the left as shown in the feed of plastic material. During the obturation, the regulating valve piston 114 will have withdrawn against the pressure transmitted by lever 115 and regulator slide valve 112. The injection process is then complete.

During this time, the injection timer 8 rotates and meters the regulating time. When the time lag has elapsed, said timer cuts off the current to timers 8 and 9, whereupon relay 7 is no longer energized and releases. This, in turn, triggers the electromagnet 27, and the plunger of distributor 40 then moves back in response to the spring loading means acting on it, and reverses the direction of the oil, thereby placing the passageway 69 in communication with the return line 40a while maintaining the passageway 63 under pressure. Fluid in passageway 63 controls the regulator. Non-return valve 111 rises upon rising of piston 41 due to the drain of fluid through the line 69 and the absence of pressure above valve 111. Since the obturating pressure in line 63 is higher than the regulating pressure, the regulating obturating tip 112' closes. Thereafter the plastic material is driven out of the recovery chamber 109 by piston 110, and this material in turn expels the injection piston 105 from the transfer chamber 104. It should be noted also that the plasticization screw assists this expulsion.

The injection withdrawal is then complete.

(3) *Opening.*—When the time lag introduced by the operation of the timer 8 has elapsed, said timer starts a second timer 9 which is effectively the cooling timer. When the time lag introduced by the cooling timer 9 has elapsed, this second timer cuts off the self energizing current to the relay 1, whereupon two other relays 3 and 4, being coupled in series therewith, are de-energized. Electromagnets 23 and 24 are, in turn, successively de-energized causing the two hydraulic pistons 46 and 48 to reverse, and the fluid under pressure to reach the pivoting piston 71 of the clamps 45', 45". The fluid enters the chambers 72 through the circular channels 73 thereof and causes the hydromechanical clamps to withdraw and pivot, the fluid contained in chambers 49 being driven out into a hydraulic fluid sump tank (not shown) connected with pump 29.

When the limit of withdrawal and pivotal motion is reached, contacts 11 energize relay 2. The advancing distributor 44 is then in communication with the return line, which causes mold section 45 to withdraw, thereby exerting a pull and opening the mold. In addition, since relay 5 is no longer energized, it also cuts out the shell opening electromagnet. Distributor 50 reverses, contacts 17 close, and the mold section continues (by piston 45) to withdraw until it comes into contact with stop switch 15, which causes the withdrawal motion to stop. Since relay 6 is energized through a contact of relay 2, through switch 15, and through various contacts 18, the safety device 35 is operated and the system comes to a halt.

The mold sections then reach their maximum opening and contacts 18 open. Since the relay 6 is no longer energized, the withdrawal motion is resumed. The mold ejector pistons 60 then come into contact as the result of the pressure differential, and the fluid in said pistons is expelled and ejection plate 61 moves forward with its ejectors 62, whereupon the molded part in the shells is ejected by engagement with the ejectors.

The cycle is then complete; all the operations take place entirely automatically and with high reliability.

Consistent with the above described embodiments and various modifications thereof, the following results can be appreciated:

(1) That injection molding machines are no longer subjected to the requirements of conventional presses, since the molds are no longer subjected to the costly pressing or jacking action of the piston cylinder-toggle in the conventional systems.

(2) That by eliminating the standard press systems, the function of the molds depends solely on the locking units and the strength of said units, mounted externally, independently and directly on the molds or the platens holding said molds.

(3) That by using the new force applying clamping means, mold parts of any size or shape can be clamped with force virtually unlimited as the number, size and the force of the clamping means can be increased as needed, to give the force required.

(4) That since the frontal areas and size of the molds are no longer the function of the conventional press action, the press action no longer limits the sizes of the supporting plates or the distance between centers of the frame, much less the ejection, centering or fixing problems, and moreover the height of the molded pieces no longer is directly related to the closure stroke of the conventional machines.

(5) That since the molding of large and heavy area articles is no longer the function of the size of the machine or its pressing section, the production of these molded articles no longer needs a press of a particular capable of their execution.

(6) Since such articles are obtained through controlled low pressure and high injection speed, it is this temperature which determines the increase in the production ratio. Such system is obtained with a single hydraulic pressure system by elimination of the hydraulic regulators and other intermediary parts.

(7) That the hydraulic consumption being exceptionally low, the excess power obtained can be transferred to the injection means with a result of a very low consumption of energy of the entire unit.

After reading the foregoing detailed description of the illustrative embodiments of the invention, it should be readily appreciated that the objects set forth at the outset of his specification have been successfully achieved. Various modifications may occur to those reading this specification, since the molding machine may have other alternative embodiments than those specifically suggested. Regardless of these modifications, however, it is to be understood that I am not limiting myself to the details shown herein, except as required by the scope of the claims.

What is claimed is:

1. In a method of operating a molding machine having separable mold sections defining a mold cavity, the steps of securing said sections together solely by applying clamping forces thereto at a plurality of spaced locations thereabout, continuously feeding material to a variable volume chamber, intermittently delivering mold material from said variable volume chamber to said cavity at a plurality of spaced locations therein, and closing off the cavity from material fed thereto in response to the back pressure of material filling said cavity.

2. The method of operating a molding machine having separable mold sections defining a mold cavity, comprising the steps of continuously delivering a supply of mold material to a variable volume chamber, intermittently conducting mold material from said variable volume chamber to an injection cylinder, intermittently injecting mold material from said injection cylinder to the mold cavity, automatically controlling communication between the variable volume chamber and the injection cylinder in response to the differential pressure therebetween, increasing the volume of said variable volume chamber so that the continuously delivered mold material is temporarily stored in said variable volume chamber when said communication is cut-off, decreasing the volume of said variable volume chamber to expel said temporarily stored mold material to said injection cylinder when communication is automatically established between the variable volume chamber and the injection cylinder, and regulating, independently of the said automatic communication control, the flow of moldable material from said injection cylinder to said mold cavity.

3. The method of injection molding into separable mold sections defining a mold cavity, comprising the steps of continuously delivering a supply of moldable material to a variable volume chamber, intermittently conducting moldable material from said variable volume chamber to an injection cylinder, intermittently injecting moldable material from said injection cylinder to the mold cavity, automatically controlling communication between the variable volume chamber and the injection cylinder in response to the differential pressure therebetween, and positively obturating the passageway between said mold cavity and said injection cylinder when the latter is in communication with said chamber.

4. The method of injections molding into separable mold sections defining a mold cavity and from a source of moldable material, comprising the steps of continuously delivering a supply of moldable material to a variable volume chamber, intermittently conducting moldable material from said variable volume chamber to an injection cylinder, intermittently injecting moldable material from said injection cylinder to the mold cavity, increasing the volume of said variable volume chamber to receive said continuously delivered supply of moldable material as the moldable material is injected from said injection cylinder to said mold cavity, and, independently of said intermittently conducting step, regulating the flow of moldable material from said injection cylinder to said mold cavity.

5. The method of injection molding by a machine having separable mold sections defining a mold cavity and a source of moldable material, comprising the steps of continuously delivering a supply of moldable material to a freely expandable chamber, intermittently positively forcing moldable material from said chamber to an injection cylinder, intermittently injecting moldable material from said injection cylinder to the mold cavity, and automatically controlling communication between the chamber and the injection cylinder such that communication is cut off during said intermittent injection as the moldable material continuously delivered from the source is temporarily stored in said chamber.

6. The method of operating a molding machine having separable mold sections defining a mold cavity and a source of moldable material, comprising the steps of continuously delivering a supply of moldable material to a variable volume chamber, intermittently positively forcing moldable material from said chamber to an injection cylinder, intermittently injecting moldable material from said injection cylinder to the mold cavity, automatically controlling communication between the chamber and the injection cylinder in response to the differential pressure therebetween, and, independently of said automatically controlling step, regulating the flow of moldable material from said injection cylinder to said mold cavity.

7. The method of operating a molding machine to fill a mold cavity with moldable plastic material at high speed while avoiding excessive increase of the pressure in such cavity following completion of the filling operation, comprising the steps of continuously supplying moldable plastic material to a variable volume recovery chamber, intermittently reducing the volume of said chamber to transfer such material from the recovery chamber to a variable volume injection chamber, intermittently reducing the volume of said injection chamber, in sequential relation to the intermittent reduction in volume of said recovery chamber, to deliver such material into the mold cavity, automatically regulating, during the filling operation, the flow of material from said injection chamber to said mold cavity so as to maintain the pressure in said mold cavity below a predetermined limit, and automatically obturating the flow passage between said injection chamber and said mold cavity, in response to the pressure rise in said passage when the mold cavity has been filled.

8. The method in accordance with claim 7, in which said automatic regulating step is performed hydraulically in response to the flow condition of the plastic material passing from said injection chamber to said mold cavity.

9. The method in accordance with claim 7, in which said automatic obturation step is under the direct control of the pressure of plastic material passing from said injection chamber to said mold cavity.

10. The method of injection molding to fill a mold cavity with moldable plastic material at high speed while avoiding excessive increase of the pressure in such cavity following completion of the filling operation, comprising the steps of continuously supplying moldable plastic material to a variable volume recovery chamber, intermittently reducing the volume of said chamber to transfer such material from the recovery chamber to a variable volume injection chamber, intermittently reducing the volume of said injection chamber, to deliver such material into the mold cavity, automatically regulating during the filling operation, the flow of material from said injection chamber to said mold cavity so as to maintain the pressure in said mold cavity below a predetermined limit, automatically obturating the flow passage between said injection chamber and said mold cavity, in response to the pressure rise in said passage when the mold cavity has been filled, and supplementally obturating said flow passage concomitantly with the reduction in volume of said recovery chamber, to seal off the flow passage independently of the filled condition of said mold cavity.

11. The method in accordance with claim 10, in which said first obturating step and said supplemental obturating step are under the joint control of a single source of fluid pressure.

References Cited by the Examiner

UNITED STATES PATENTS

| | | | |
|---|---|---|---|
| 1,916,495 | 7/1933 | Shaw | 264—328 |
| 2,329,287 | 9/1943 | Miller | 264—328 X |
| 2,359,013 | 9/1944 | Tucker | 264—329 |
| 2,359,840 | 10/1944 | Goessling. | |
| 2,420,709 | 5/1947 | Kopplin | 18—43 |
| 2,754,545 | 7/1956 | Hendry. | |
| 2,831,214 | 4/1958 | Eyles et al. | |
| 2,879,545 | 3/1959 | Bailey | 18—43 |
| 2,890,491 | 6/1959 | Hendry | 264—329 |
| 2,981,982 | 5/1961 | Pendrof | 264—328 |
| 3,016,574 | 1/1962 | Fischer et al. | |
| 3,023,458 | 3/1962 | Seymore. | |

FOREIGN PATENTS

| | | |
|---|---|---|
| 912,194 | 4/1946 | France. |
| 1,150,189 | 8/1957 | France. |
| 1,007,053 | 4/1957 | Germany. |
| 1,142,229 | 1/1963 | Germany. |
| 498,653 | 1/1939 | Great Britain. |
| 474,590 | 9/1952 | Italy. |
| 358,585 | 1/1962 | Switzerland. |

ROBERT F. WHITE, *Primary Examiner.*

ALEXANDER H. BRODMERKEL, *Examiner.*

J. R. DUNCAN, R. B. MOFFITT, *Assistant Examiners.*